(12) United States Patent
Allouche

(10) Patent No.: US 7,008,660 B2
(45) Date of Patent: Mar. 7, 2006

(54) FROZEN DESSERT WITH VERY HIGH PROTEIN AND VERY LOW CALORIE CONTENT, AND METHOD FOR PREPARING THE SAME

(75) Inventor: Réginald Allouche, Paris (FR)

(73) Assignee: Ceprodi—Compagnie Europeennee De Produits Dietetiques, Paris (FR)

( * ) Notice: Subject to any disclaimer, the term of this patent is extended or adjusted under 35 U.S.C. 154(b) by 1 day.

(21) Appl. No.: 10/220,417

(22) PCT Filed: Feb. 27, 2001

(86) PCT No.: PCT/FR01/00564

§ 371 (c)(1),
(2), (4) Date: Oct. 30, 2002

(87) PCT Pub. No.: WO01/64045

PCT Pub. Date: Sep. 7, 2001

(65) Prior Publication Data

US 2003/0104104 A1 Jun. 5, 2003

(30) Foreign Application Priority Data

Feb. 29, 2000 (FR) .................................. 00 02665

(51) Int. Cl.
A23G 9/00 (2006.01)
A23G 3/00 (2006.01)
(52) U.S. Cl. ...................... 426/565; 426/567; 426/658; 426/660; 426/804
(58) Field of Classification Search ................ 426/565, 426/567, 658, 660, 804
See application file for complete search history.

(56) References Cited

U.S. PATENT DOCUMENTS

| | | | | |
|---|---|---|---|---|
| 4,435,439 A | * | 3/1984 | Morris | ........................ 426/565 |
| 4,626,441 A | * | 12/1986 | Wolkstein | .................... 426/548 |
| 4,643,906 A | | 2/1987 | Pitz | |
| 4,874,627 A | * | 10/1989 | Greig et al. | ................. 426/565 |
| 5,084,295 A | * | 1/1992 | Whelan et al. | ............. 426/565 |
| 5,093,137 A | * | 3/1992 | Shazer et al. | .................. 426/42 |
| 5,215,777 A | * | 6/1993 | Asher et al. | ................. 426/565 |
| 6,010,734 A | * | 1/2000 | Whelan et al. | ............. 426/565 |
| 6,139,899 A | * | 10/2000 | Matsuura et al. | ........... 426/634 |
| 6,558,729 B1 | * | 5/2003 | Riviere et al. | ............... 426/565 |
| 2003/0215559 A1 | * | 11/2003 | Mikaelian et al. | .......... 426/634 |

FOREIGN PATENT DOCUMENTS

| | | |
|---|---|---|
| EP | 0600670 | 6/1994 |
| WO | 93/02567 | 2/1993 |
| WO | 98/44807 | 10/1998 |
| WO | 99/51106 | 10/1999 |
| WO | 00/07457 | 2/2000 |

OTHER PUBLICATIONS

Patent abstracts of Japan of JP02255046.
Patent abstracts of Japan of JP01218553.
Patent abstracts of Japan of JP06165656.
Patent abstracts of Japan of JP62232361.
Derwent abstract of SU1750601.
Derwent abstract of FR2788409.
Derwent abstract of FR2781125.
Derwent abstract of NL8702797.

* cited by examiner

*Primary Examiner*—N. Bhat
(74) *Attorney, Agent, or Firm*—DLA Piper Rudnick Gray Cary US LLP

(57) ABSTRACT

Frozen dessert with very high protein and very low calorie content, having a protein content ranging between 8 and 15%, a carbohydrate content ranging between 6 and 14% and a lipid content ranging between 1 and 5%, those percentages being expressed by weight relative to the total weight of the commercial product, and method for making said frozen dessert with very high protein and very low calorie content.

10 Claims, No Drawings

FROZEN DESSERT WITH VERY HIGH PROTEIN AND VERY LOW CALORIE CONTENT, AND METHOD FOR PREPARING THE SAME

This application is a 371 of PCT/FR01/00564 filed on Feb. 27, 2001.

The invention relates to a frozen dessert with very high protein and very low calorie content. It also relates to the method for preparing this frozen dessert.

For the purpose of the invention, the term "frozen dessert" is intended to mean any deep frozen food preparation intended to be consumed as it is when taken out of a freezer or a refrigerator, said food preparation possibly being in particular in the form of an ice cream, an ice or sorbet.

Conventional frozen desserts are, above all else, reputed to be products which do not go along with dieting, since they contain either a high content of fats or a content of simple carbohydrates such as sugars (in the case of sorbets), or both. This is, of course, the case of chocolate ice creams, for example, which consist of a mixture of cocoa, sugar and cream. Even the frozen desserts which are on the market as having a reduced sugar content, have a high calorific value due to the fact that, generally, the reduction in sugar content is compensated by an increase in the fat content. The same is true for desserts presented as having a reduced fat content, since, most commonly, the decrease in fat content has been obtained through an increase in the sugar content.

It is undeniable that, increasingly, consumers pay attention to their physical appearance, in particular because of the very slender appearance of the models shown in magazines or on posters or in television adverts. Most individuals would, consequently, like to lose weight but without, however, sacrificing the pleasure they get from eating food. The ideal situation would therefore be to be able to continue to eat with enjoyment, that is to say eating products with a high quality of taste, at will, without however gaining weight. Consumers are in fact being led increasingly to turn to multiple diets termed "slimming diets", which are most generally characterized by a lower daily intake of calories, obtained by ingesting a smaller amount of food, most commonly combined with a decrease in the fat content.

These diets are unfortunately difficult to adhere to over a long period of time and lead to a loss of weight linked to a loss of muscle mass, i.e. a loss of lean mass. A lack of tonicity and of elasticity of the skin is then observed, at the same time as a physical and intellectual asthenia. In addition, individuals who follow these slimming diets to the letter do not eat as much as they would like and therefore suffer from hunger and feel frustrated.

A real need therefore exists for diet products which, while having a very low calorie content, do not lead to the harmful consequences indicted above, and which allow consumers to follow a diet with pleasure, i.e. which allow them to eat until satisfied and to lose their fattiness, without this being to the detriment of their leanness.

This is all the more true with regard to conventional and commonly consumed frozen desserts.

It is therefore acknowledged that it will be necessary to provide the body, during these periods of decreased calorie intake, with a greater intake of proteins with high nutritional and biological values.

However, this additional constraint very notably complicates the practice of formulating frozen desserts which, at the same time, are very low calorie, can be industrialized and are stable in terms of conservation, and which have a satisfactory texture and taste. With regard to texture, it is important for frozen desserts, when they are taken out of the freezer or the fridge, to have the ability to be easily cut or served with a spoon, and to be suitably soft and creamy when tasted.

Now, to the applicant's credit, it has succeeded in developing, after many experiments, a frozen dessert the physical, textural and organoleptic characteristics of which are substantially close to those of conventional ice creams, and which has both a very low calorie content and a very high protein content. This frozen dessert is in deep frozen form and may be provided in a tub, in a cup or cast in the form of sticks, coated with a coating agent, with or without color marks or texture marks, pieces or purees, sauce or topping.

The frozen dessert with very high protein and very low calorie content in accordance with the invention is characterized in that it has, the percentages being expressed weight per weight relative to the commercial product, a protein content (calculated in N×6.25) of between approximately 8 and approximately 15%, a carbohydrate content of between approximately 6 and approximately 14%, and a lipid content of between approximately 1 and approximately 5%.

The frozen dessert in accordance with the invention preferably has a protein content of between 8 and 14%, a carbohydrate content of between 7 and 14% and a lipid content of between 2 and 5%.

Even more preferentially, the frozen dessert according to the invention has a protein content of between 8.5 and 13%, a carbohydrate content of between 7.5 and 13% and a lipid content of between 2.25 and 5%. The total calorific value of the frozen dessert is between 85 and 130 Kcal/100 grams, preferably between 90 and 130 Kcal/100 grams, and even more preferentially between 95 and 130 Kcal/100 grams.

The frozen dessert according to the invention is also characterized in that its chemical index is greater than 100.

It is recalled that, the "chemical index of a protein" is intended to mean the product of multiplying by 100 the smallest of the quotients obtained by dividing, for each of the essential amino acids or groups of essential amino acids, the amount present in 100 g of this protein by the corresponding amount present in 100 g of the protein used as a reference, this being characterized by the following contents adjusted for 100 g:

| | |
|---|---|
| L isoleucine | 4 g |
| L leucine | 7 g |
| L lysine | 5.5 g |
| DL methionine + L cystine | 3.5 g |
| L phenylalanine + L tyrosine | 6 g |
| L threonine | 4 g |
| L tryptophan | 1 g |
| L valine | 5 g |

In the event that the formula proves to be deficient in amino acids, they are added in a sufficient amount for the chemical index to be greater than 100.

The proteins used for constituting the frozen dessert in accordance with the invention may be of animal and/or plant origin. Use is preferably made of milk proteins, such as casein, total milk proteins, lactalbumine, lactoserum, milk protein concentrates containing little or no lactose, ultrafiltered milk proteins, ultrafiltered serum proteins, buttermilk and ultrafiltered buttermilk, or heat-coagulated, lactose-free serum proteins. According to a preferential embodiment of the invention, the milk proteins are present in an amount of between 7 and 13%, preferably between 8 and 12.5%, and even more preferentially between 8.5 and 12%.

Along with the milk proteins, use may also be made in particular of proteins from egg, from soya bean, from pea, from lupin, from wheat, etc.

As carbohydrates, use may be made of maltodextrins, hydrogenated maltodextrins, sugars, polyols, and polymers of glucose or fructose which are difficult to digest, such as polydextrose. Most generally, the frozen dessert in accordance with the invention has a polyol content of between 2 and 6%, preferably of between 3 and 5%, and a content of polymers of glucose or fructose which are difficult to digest of between 2 and 6%, preferably of between 3 and 5%. As lipids, use is made of powders of copra, palm, soyabean or sunflower fats; or alternatively refined and hydrogenated copra or palm oils. A source of lipids may also consist of the emulsifier, such as, for example, mono- and/or polyglycerides of fatty acids).

As polyols, use may be made of lactitol, sorbitol, xylitol, maltitol, mannitol and hydrogenated glucose syrups, lactitol being preferred.

The frozen dessert in accordance with the invention may also have a content of 0.1 to 2%, preferably of 0.1 to 1.5%, and even more preferentially of 0.1 to 1%, of texturizing agents consisting of emulsifiers and hydrocolloidal stabilizers, the emulsifiers preferably being mono- or diglycerides of fatty acids and the hydrocolloidal stabilizers preferably being guar seed flour or carrageenans.

Most generally, the frozen dessert according to the invention comprises from 8 to 15% of proteins of animal or plant origin, from 2 to 7% of powdered milk containing 0% fat, and from 0.01 to 9% of sweetening agents and organic substances, in particular amino acids. 100 grams of finished product provide at least 9 grams of proteins and, in addition, the ratio of the calorific value of the proteins to the total calorific value of the finished product is greater than 0.35. Moreover, the proportion of water in the finished product is between 70 and 82%, preferably between 70 and 80%.

According to a preferential characteristic, the frozen dessert according to the invention comprises between 2 and 5%, preferably between 2.5 and 4.5%, and even more preferentially between 2.5 and 4.25% of powdered milk containing 0% fat, and between 1 and 6%, preferably between 1 and 5.5%, and even more preferentially between 1 and 5%, of hydrogenated refined oils. Of course, the frozen dessert in accordance with the invention may also contain other conventional ingredients, such as conventional powdered milk, hydrocolloids, amino acids, spices, taste-enhancing agents, strong sweeteners, colorants, vitamins, minerals, or insoluble or soluble fibers, and may contain, inter alia, pieces of fruit, of praline and/or of chocolate and other color marks or texture marks or aromatic agents as powder and/or as pieces and/or in liquid form.

Most commonly, the ingredients are in the form of powder. The mix is reconstituted from these powders largely with water or with skimmed milk.

A subject of the invention is also the method for preparing the frozen dessert according to the invention, this method comprising the following steps:
selecting the ingredients, weighing and measuring out, said ingredients being, for the most part, in the form of powders,
closely mixing, with agitation, these ingredients, with or without premixing,
hydrating the mixture,
heating to a temperature of greater than 50° C. in order to completely dissolve the sugars and melt the fats,
pasteurizing and homogenizing under pressure,
maturing optionally in the presence of flavorings and artificial sweeteners of the aspartame or acesulfame K type,
overrunning and then deep freezing and freezing.

The invention may be more clearly understood through the examples of preparation which follow, given purely by way of illustration.

EXAMPLE

Formulation of Frozen Desserts According to the Invention

Frozen desserts in accordance with the invention, corresponding to the formulations given in the table below, are prepared and tested by a tasting panel.

| | Formula 1 | Formula 2 | Formula 3 | Formula 4 |
|---|---|---|---|---|
| Caramel flavoring (company QEST) | 0.05 | 0.05 | 0.05 | — |
| Vanilla flavoring | 0.2 | 0.2 | 0.2 | 0.437 |
| Natural vanilla extract | 1.6 | — | — | — |
| 1.7% β-carotene colorant (Dr MARCUS) | 0.1 | 0.1 | 0.1 | 0.088 |
| Vanilla pod | 0.04 | 0.04 | 0.04 | 0.04 |
| ALAPLEX 1380 protein (total milk protein; supplier NZMP) | 9 | 10 | 11.5 | 10 |
| Powdered milk containing 0% fat | 6 | 3.5 | 0 | 3.5 |
| Lactitol | — | 4 | 5 | 4 |
| LITESSE | — | 4 | 5 | 4 |
| RAFTILOSE L60 (oligofructose syrup) | 6 | — | — | — |
| Aspartame | 0.015 | 0.015 | 0.015 | 0.035 |
| Acesulfame K | 0.03 | 0.03 | 0.03 | 0.03 |
| Water | 74.06 | 75.065 | 75.065 | 74.901 |
| Hydrogenated coco | 2.7 | 2.7 | 2.7 | 2.7 |
| L-methionine | — | 0.1 | 0.1 | 0.1 |
| Lygomme FM 4609 (combination of mono- and diglyceride fatty acids, and carob and guar seed flour, and carrageenans; supplier S.K.W.) | 0.2 | 0.2 | 0.2 | 0.2 |
| Organoleptic test | Tastes a little too much of protein | Satisfactory. Less of a sandy feeling in the mouth | Tastes slightly of protein | Entirely satisfactory |
| Texture | Relatively hard, but creamy in the mouth | Texture less hard | Less creamy than formula 2, uneven, slightly floury | Correct hardness, small crystals. Homogeneous texture |

The problems encountered in formulating the frozen dessert were mainly a problem of it being too hard, due to the absence of sugar, which generally allows better crystallization or finer crystallization, and also an unpleasant taste and a sandy texture brought about by the increase in the protein content. Moreover, the deficit in fats compared to conventional frozen desserts (fats most commonly provided by dairy cream), leads, quite obviously, to a lack of creaminess.

These problems were solved satisfactorily in the frozen desserts corresponding to formulations 1 to 4, formulation 4 being judged to be the best by the tasting panel. The milk proteins of the ALAPLEX brand are preferred to caseine or to caseinates, which contribute to the hardness of the frozen dessert and which introduce too sandy a texture. Moreover, it was noted that replacing the sucrose or the fructose with raftilose made it possible to introduce a little creaminess and a better sweet taste, but may cause risks of crystallization. Use of lactitol and of polydextrose provides an entirely satisfactory solution.

The increase in the content of lactitol and of polydextrose (LITESSE) from formula 2 to formula 3 thus makes it possible to improve the fineness of crystallization.

Formula 4 makes it possible to obtain the best results. A frozen dessert with very high protein content and very low calorie content, which has textural and organoleptic characteristics very close to conventional frozen desserts containing sucrose or high fat content, is thus obtained.

The invention claimed is:

1. A frozen dessert with very high protein and very low calorie content, having a protein content of between 8 and 15% said protein consisting of total milk protein, a carbohydrate content of between 6 to 14%, which carbohydrate content includes a polyol content of between 3 and 5% said polyol being lactitol and a content of glucose or fructose polymers which are difficult to digest of between 2 and 6%, and a lipid content of between 1 and 5%, said lipid consisting of refined and hydrogenated copra or palm oils, these percentages being expressed as weight per weight relative to the frozen dessert.

2. The frozen dessert as claimed in claim 1, having a chemical index of greater than 100.

3. The frozen dessert as claimed in claim 1, wherein the calorific value is between 85 and 130 Kcal/100 grams.

4. The frozen dessert as claimed in claim 1, having a content of 0.1 to 2% of texturizing agents consisting of emulsifiers selected from the group consisting of mono- or diglycerides of fatty acids and hydrocolloidal stabilizers selected from the group consisting of guar seed flour and carrageenans.

5. The frozen dessert as claimed in claim 1, having a proportion of water in the finished product of between 70 and 82%.

6. The frozen dessert as claimed in claim 1, wherein the calorific value is between 90 and 130.

7. The frozen dessert as claimed in claim 1, wherein the calorific value is between 95 and 130 Kcal/100 grams.

8. The frozen dessert as claimed in claim 1, having a content of 0.1 to 1.5%, of texturizing agents consisting of emulsifiers selected from the group consisting of mono- or diglycerides of fatty acids and hydrocolloidal stabilizers selected from the group consisting of guar seed flour and carrageenans.

9. The frozen dessert as claimed in claim 1, having a content of 0.1 to 1.0%, of texturizing agents consisting of emulsifiers selected from the group consisting of mono- or diglycerides of fatty acids and hydrocolloidal stabilizers selected from the group consisting of guar seed flour and carrageenans.

10. A frozen dessert comprising 8 to 15% of proteins, 2 to 7% of powdered milk containing 0% fat, and from 0.01 to 9% of sweetening agents and organic substances such as amino acids.

* * * * *